(12) United States Patent
Ohtsuka et al.

(10) Patent No.: US 6,314,120 B1
(45) Date of Patent: Nov. 6, 2001

(54) SEMICONDUCTOR LASER PUMPED SOLID STATE LASER

(75) Inventors: Hisashi Ohtsuka; Kiichi Kato; Yoji Okazaki, all of Kanagawa-ken (JP)

(73) Assignee: Fuji Photo Film Co., Ltd., Kangawa-Ken (JP)

( * ) Notice: Subject to any disclaimer, the term of this patent is extended or adjusted under 35 U.S.C. 154(b) by 0 days.

(21) Appl. No.: 09/330,012

(22) Filed: Jun. 11, 1999

(30) Foreign Application Priority Data

Jun. 11, 1998 (JP) .................................................. 10-163614

(51) Int. Cl.[7] .................................................. H01S 3/093
(52) U.S. Cl. .................................................. 372/75
(58) Field of Search .................................................. 372/75

(56) References Cited

U.S. PATENT DOCUMENTS 6,055,260 * 4/2000 Byren et al. ........................... 372/72

FOREIGN PATENT DOCUMENTS 6-69564    3/1994 (JP) ...................... H01S/3/02
6-97545    4/1994 (JP) ...................... H01S/3/094

* cited by examiner

*Primary Examiner*—Teresa M. Arroyo
*Assistant Examiner*—Jeffrey N Zahn
(74) *Attorney, Agent, or Firm*—Sughrue, Mion, Zinn, Macpeak & Seas, PLLC

(57) ABSTRACT

A semiconductor laser pumped solid state laser includes a solid laser medium, a semiconductor laser which radiates a pumping laser beam for pumping the solid laser medium, and a light entrance optical system which converges the pumping laser beam in the solid laser medium. The semiconductor laser is disposed with its beam radiating axis inclined to the optical axis of the light entrance optical system so that the pumping laser beam travelling from the semiconductor laser to the solid laser medium and a laser beam reflected at the pumping light inlet side end face of the solid laser medium travel different optical paths. A light-shielding plate which intercepts the laser beam reflected at the pumping light inlet side end face of the solid laser medium is provided between the semiconductor laser and the solid laser medium.

8 Claims, 2 Drawing Sheets

EFECTIVE
BEAM DIAMETER

EFECTIVE
BEAM DIAMETER

SEMICONDUCTOR LASER PUMPED SOLID STATE LASER

BACKGROUND OF THE INVENTION

1. Field of the Invention

This invention relates to a semiconductor laser pumped solid state laser, and more particularly to a semiconductor laser pumped solid state laser in which generation of noise due to return light to the semiconductor laser is prevented.

2. Description of the Related Art

There has been known a solid state laser in which a solid laser medium is pumped by a semiconductor laser (laser diode) as disclosed, for instance, in Japanese Unexamined Patent Publication No. 6(1994)-69564.

In such a semiconductor laser pumped solid state laser, there has been a problem that return light, which is pumping light reflected at an end face of the laser medium, makes oscillation of the semiconductor laser unstable and fluctuates intensity and/or wavelength of the pumping light, thereby generating noise and/or fluctuation in the output of the solid state laser.

As an arrangement for overcoming the problem, there has been known a structure in which a return light intercepting wavelength plate having a desired phase delay is disposed between the semiconductor laser and the resonator of the solid state laser, as disclosed, for instance, in Japanese Unexamined Patent Publication No. 6(1994)-69564. In this approach, the direction of linear polarization of a pumping light beam returning toward the semiconductor laser is set in perpendicular to the direction of linear polarization of a pumping light beam which is emitted from the semiconductor laser and travels toward the solid laser medium by the return light intercepting wavelength plate, thereby preventing interference of the light beams with each other.

Further there has been proposed an arrangement in which the pumping beam is caused to impinge upon the light inlet end face of the solid laser medium obliquely thereto as disclosed in Japanese Unexamined Patent Publication No. 6(1994)-97545.

However the arrangement disclosed in Japanese Unexamined Patent Publication No. 6(1994)-69564 is disadvantageous in the that a wavelength plate which is generally of rock crystal and expensive is used, which adds to the cost. Further, in this arrangement, when there is some optical element other than the solid laser medium in the resonator of the solid state laser, the phase of the pumping beam reflected at the optical element can differ from that of the pumping laser beam reflected at the end faces of the laser medium. Further when the solid laser medium itself exhibits birefringence like $YVO_4$, the pumping beam reflected at the light outlet side end face differs from that reflected at the light inlet side end face in phase. The direction of linear polarization of such light beams cannot be perpendicular to the direction of linear polarization of a pumping light beam which is emitted from the semiconductor laser and travels toward the solid laser medium by the return light intercepting wavelength plate. Accordingly it is difficult to completely prevent interference of light beams and generation of noise due to the return light cannot be sufficiently suppressed.

Further, in the arrangement disclosed in Japanese Unexamined Patent Publication No. 6(1994)-97545, since the light emitting surface of the semiconductor laser and the reflecting surface of the solid laser medium form a confocal optical system, return light entering a lens of a light entrance optical system is all converged on the light emitting surface of the semiconductor laser. Accordingly in order to suppress generation of noise due to the return light, it is necessary for the light entrance optical system to be inclined at such a large angle that return light cannot enter the lens.

However when the light entrance optical system is inclined at such a large angle, the effective beam diameter of the pumping beam in the solid laser medium becomes large as can be understood from FIGS. 3A and 3B where reference numerals 1 and 2 respectively denote the solid laser medium and the pumping beam, and matching of the pumping laser beam with the solid laser beam. As a result, there arise problems of deterioration in efficiency and fluctuation in output power and generation of noise due to deterioration of transverse mode. Further when the light entrance optical system is inclined at such a large angle, the overall size of the solid state laser is increased.

SUMMARY OF THE INVENTION

In view of the foregoing observations and description, the primary object of the present invention is to provide a semiconductor laser pumped solid state laser in which generation of noise due to return light to the semiconductor laser is prevented without deteriorating the efficiency or transverse mode or increasing the overall size of the solid state laser.

In accordance with the present invention, there is provided a semiconductor laser pumped solid state laser comprising a solid laser medium, a semiconductor laser which radiates a pumping laser beam for pumping the solid laser medium, and a light entrance optical system which converges the pumping laser beam in the solid laser medium, wherein the improvement comprises that the semiconductor laser is disposed with its beam radiating axis inclined to the optical axis of the light entrance optical system so that the pumping laser beam travelling from the semiconductor laser to the solid laser medium and a laser beam reflected at the pumping light inlet side end face of the solid laser medium travel different optical paths, and a light-shielding plate which intercepts the laser beam reflected at the pumping light inlet side end face of the solid laser medium is provided between the semiconductor laser and the solid laser medium.

It is preferred that the semiconductor laser be disposed with its laser beam radiating point deviated from the optical axis of the light entrance optical system. Further it is preferred that the light-shielding plate be antireflection-processed.

It is preferred that a λ/4 plate for the pumping laser beam travelling from the semiconductor laser to the solid laser medium be provided on the optical path of the same.

In the semiconductor laser pumped solid state laser of this invention, the light-shielding plate disposed provided between the semiconductor laser and the solid laser medium surely prevents the return light from impinging upon the semiconductor laser, whereby generation of noise in the pumping laser beam radiated from the semiconductor laser can be surely prevented and accordingly generation of noise in the solid laser beam radiated from the solid state laser can be surely prevented.

Further in the semiconductor laser pumped solid state laser of this invention, since the light entrance optical system is not inclined to the solid laser medium but the semiconductor laser is inclined to the light entrance optical system, the effective beam diameter of the pumping laser beam in the solid laser medium do not become substantially large. Accordingly deterioration in matching of the pumping laser beam with the solid laser beam which can give rise to problems of deterioration in efficiency and fluctuation in output power and generation of noise due to deterioration of transverse mode can be avoided. Further the aforesaid problem of increase in the overall size of the solid state laser caused when the light entrance optical system is inclined at a large angle can be avoided.

When the semiconductor laser is disposed with its laser beam radiating point deviated from the optical axis of the light entrance optical system, even if a part of the return light is not intercepted by the light-shielding plate, it cannot return to the laser beam radiating point of the semiconductor laser, whereby generation of noise can be prevented more surely.

Further, the light-shielding plate may be a metal plate that is inexpensive compared with the wavelength plate and the like which are conventionally employed. Accordingly, the semiconductor laser pumped solid state laser of this embodiment can be manufactured at a cost as low as that for a semiconductor laser pumped solid state laser not using a return light preventing measure.

Further when the light-shielding plate is antireflection-processed, the pumping laser beam reflected at the light inlet end face of the solid laser medium cannot be further reflected by the light-shielding plate toward the solid laser medium along the original optical path and reflected by the light inlet end face of the solid laser medium toward the semiconductor laser.

DESCRIPTION OF THE PREFERRED EMBODIMENTS

Figure 1:
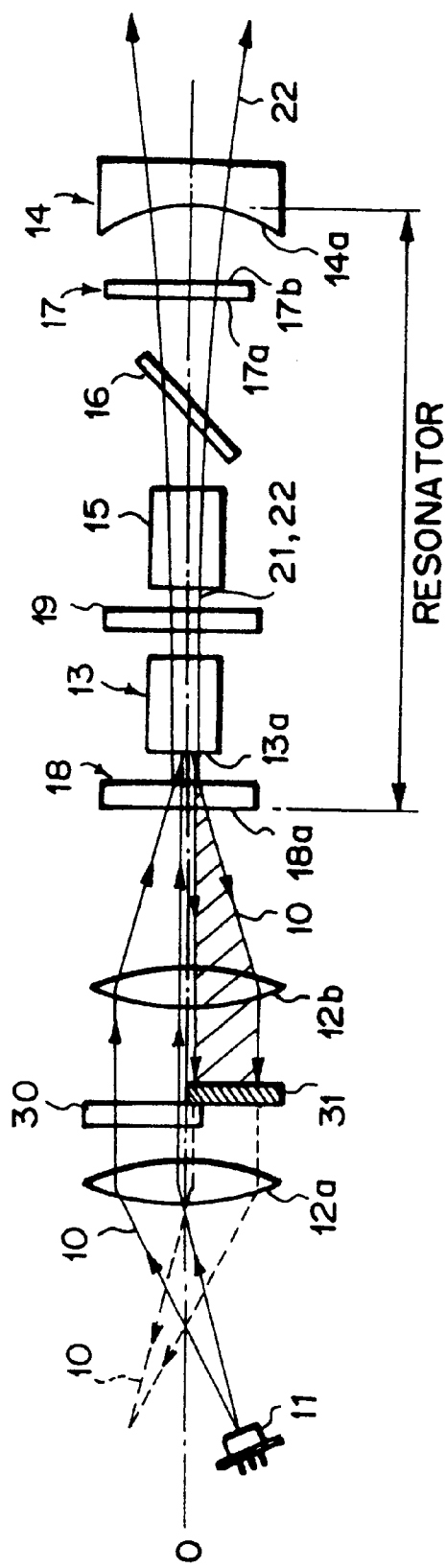
FIG. 1 is a schematic side view showing a semiconductor laser pumped solid state laser in accordance with an embodiment of the present invention.

In FIG. 1, a semiconductor laser pumped solid state laser in accordance with an embodiment of the present invention comprises a semiconductor laser 11 which radiates a pumping laser beam 10, a collimator lens 12a which collimates the pumping laser beam 10 radiated as divergent light, a condenser lens 12b which condenses the collimated pumping laser beam 10, a YLF crystal 13 which is a solid laser medium doped with neodymium (Nd) (will be referred to as "Nd:YLF crystal", hereinbelow), a resonator mirror 14 which is disposed forward of the Nd:YLF crystal 13 (on the side opposite to the semiconductor laser 11), a MgO:LN crystal (a LiNbO$_3$ crystal doped with MgO) 15 which is a nonlinear optical element having periodic domain reversals and is disposed between the Nd:YLF crystal 13 and the resonator mirror 14, and a Brewster plate 16 and a solid etalon 17 which are for polarization control and are disposed between the MgO:LN crystal 15 and the resonator mirror 14.

Further a pair of λ/4 plates 18 and 19 (e.g., sapphire plates) which are for making a twist mode of the oscillation mode of the solid state laser are disposed on opposite sides of the Nd:YLF crystal 13.

A return light intercepting λ/4 plate (a λ/4 plate for a wavelength of 797 nm to be described later) 30 is disposed between the collimator lens 12a and the condenser lens 12b above the optical axis thereof and a return light intercepting light-shielding plate 31 is disposed between the collimator lens 12a and the condenser lens 12b below the optical axis thereof.

The elements described above are mounted on a casing (not shown). Further, the resonator of the semiconductor laser pumped solid state laser of this embodiment is formed by the λ/4 plate 18 and the resonator mirror 14 as will be described later. The resonator and the semiconductor laser 11 are kept at respective predetermined temperatures by a temperature control means (not shown).

The optical axis of the light entrance optical system formed by the collimator lens 12a and the condenser lens 12b is aligned with the optical axis of the resonator. The semiconductor laser 11 is positioned with its light radiating axis inclined to the common optical axis O of the light entrance optical system and the resonator and with its laser beam radiating point deviated from the optical axis O. The light radiating axis of the semiconductor laser 11 is inclined at 2° to the optical axis O. In FIG. 1, the angle of inclination is exaggerated.

The semiconductor laser 11 radiates a laser beam 10 at 797 nm. The neodymium ions in the c-cut Nd:YLF crystal 13 are pumped by the pumping laser beam 10 and the Nd:YLF crystal 13 radiates light at 1314 nm. The light inlet side end face 18a of the λ/4 plate 18 is provided with coating which is highly reflective to light at 1314 nm (at least 99% in reflectivity) and highly transmissive to the pumping laser beam 10 at 797 nm (at least 93% in transmittance).

The mirror surface 14a of the resonator mirror 14 is provided with coating which is highly reflective to light at 1314 nm (at least 99% in reflectivity) and highly transmissive to light at 657 nm to be described later (at least 90% in transmittance).

Accordingly the light at 1314 nm is confined between the light inlet side end face 18a of the λ/4 plate 18 and the mirror surface 14a and is caused to lase, whereby a 1314 nm laser beam 21 is generated. The laser beam 21 is converted to its second harmonic 22, which is red and at 657 nm, by the MgO:LN crystal 15, and the second harmonic 22 is mainly radiated through the resonator mirror 14.

The λ/4 plates 18 and 19 are positioned so that their crystal axes are at 90° relative to each other. With this arrangement, the laser beam 21 is made to oscillate in a twist mode between the λ/4 plates 18 and 19. Further by virtue of the solid etalon 17 which acts as a wavelength selector, the laser beam 21 is caused to oscillate in a single longitudinal mode, whereby the second harmonic 22 also oscillates in a single longitudinal mode.

The pumping laser beam 10 is condensed by the condenser lens 12b to converge in the Nd:YLF crystal 13 near the light inlet end face 13a of the crystal 13. The pumping laser beam 10 can be reflected toward the semiconductor laser 11 at the light inlet end face 13a of the crystal 13.

However, in the solid state laser of this embodiment, since the semiconductor laser 11 is inclined to the optical axis O as described above, the collimated pumping laser beam 10 travels only above the optical axis O between the collimator lens 12a and the condenser lens 12b and accordingly the laser beam 10 reflected at the light inlet side end face 13a travels only below the optical axis O and is substantially completely intercepted by the light-shielding plate 31 which is positioned as described above.

Accordingly, the reflected laser beam 10 is prevented from impinging upon the semiconductor laser 11 as return light, whereby generation of noise in the solid laser beam 22 radiated from the solid state laser due to return light can be surely prevented.

Further in the semiconductor laser pumped solid state laser of this embodiment, since the semiconductor laser 11 is disposed with its laser beam radiating point deviated from the optical axis O of the light entrance optical system, even if a part of the return light is not intercepted by the light-shielding plate 31, it cannot return to the laser beam radiating point of the semiconductor laser 11 as shown by the dashed line in FIG. 1, whereby generation of noise due to return light can be prevented more surely.

Further since the light-shielding plate 31 is antireflection-processed, the pumping laser beam 10 reflected at the light inlet end face 13a of the solid laser medium 13 cannot be further reflected by the light-shielding plate 31 back to the solid laser medium 13 and reflected by the light inlet end face 13a toward the semiconductor laser 11.

Further even if the pumping laser beam 10 is reflected at the light-shielding plate 31 or other optical elements to travel above the optical axis O toward the semiconductor laser 11, the direction of polarization of the reflected pumping laser beam 10 is made to be at 90° to that of the laser beam 10 travelling from the semiconductor laser 11 toward the Nd:YLF crystal 13 by the $\lambda/4$ plate 30, whereby generation of noise due to return light can be prevented.

In the present invention, the return light intercepting $\lambda/4$ plate 30, which is relatively expensive, need not be provided. Even if the $\lambda/4$ plate 30 is provided, since, in the embodiment shown in FIG. 1, the $\lambda/4$ plate 30 may be small in diameter, about half of those of the lenses 12a and 12b, provision of the $\lambda/4$ plate 30 does not largely add to the manufacturing cost.

Further when the return light intercepting $\lambda/4$ plate 30 is provided, the light-shielding plate 31 can be used as a jig for holding the $\lambda/4$ plate 30.

Figure 2:
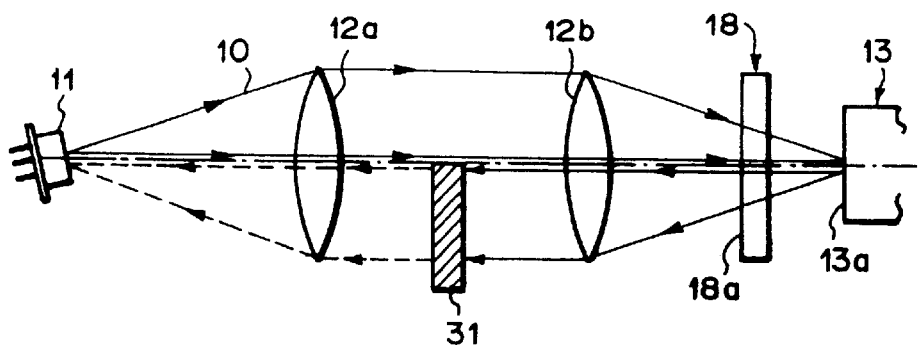
FIG. 2 is a schematic side view showing a semiconductor laser pumped solid state laser in accordance with another embodiment of the present invention.
Figure 3A:
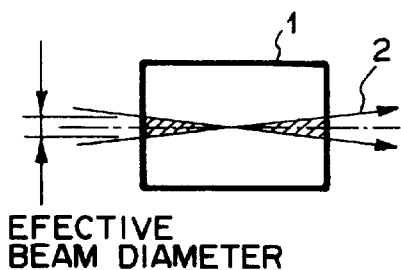
FIGS. 3A and 3B are schematic views for illustrating the effective pumping beam diameter in the solid laser medium.
Figure 3B:
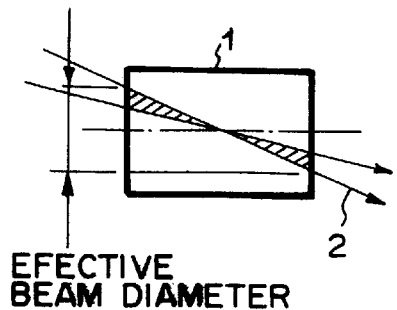

Further, the semiconductor laser 11 may be disposed with its laser beam radiating point positioned on the optical axis O of the light entrance optical system as shown in FIG. 2. Also in this case, so long as the pumping laser beam 10 reflected at the light inlet side end face 13a of the Nd:YLF crystal 13 is well intercepted by the light-shielding plate 31, generation of noise due to return light can be prevented.

More specifically, whereas noise due to return light was about 2% at most in a semiconductor laser pumped solid state laser not provided with a return light preventing measure, it could be reduced up to about 0.2% in the arrangement shown in FIG. 1, up to about 0.5% in the arrangement shown in FIG. 1 removed with the return light intercepting $\lambda/4$ plate 30 and up to about 1% in the arrangement shown in FIG. 2.

In the case where any one of the aforesaid measures were taken, reduction in the output of the second harmonic 22 was suppressed not more than 2% as compared with the case where none of the aforesaid measures were taken, and the transverse mode was kept to be $TEM_{00}$ mode.

What is claimed is:

1. A semiconductor laser pumped solid state laser comprising:

a solid laser medium;

a semiconductor laser which radiates a pumping laser beam for pumping the solid laser medium;

a light entrance optical system which converges the pumping laser beam in the solid laser medium, wherein the semiconductor laser is disposed with its beam radiating axis inclined to the optical axis of the light entrance optical system so that the pumping laser beam travelling from the semiconductor laser to the solid laser medium and a laser beam reflected at the pumping light inlet side end face of the solid laser medium travel different optical paths; and a light-shielding plate which intercepts the laser beam reflected at the pumping light inlet side end face of the solid laser medium provided between the semiconductor laser and the solid laser medium.

2. A semiconductor laser pumped solid state laser as defined in claim 1 in which the semiconductor laser is disposed with its laser beam radiating point deviated from the optical axis of the light entrance optical system.

3. A semiconductor laser pumped solid state laser as defined in claim 1 in which the light-shielding plate is antireflection-processed.

4. A semiconductor laser pumped solid state laser as defined in claim 1 in which a $\lambda/4$ plate for the pumping laser beam travelling from the semiconductor laser to the solid laser medium is provided on the optical path of the same.

5. A semiconductor laser pumped solid state laser according to claim 1, further comprising:

a collimator lens which collimates the pumping laser beam radiated as divergent light; and a condenser lens for condensing the collimated pumping laser beam.

6. A semiconductor laser pumped solid state laser according to claim 5, wherein said light-shielding plate is disposed between said collimator lens and said condenser lens.

7. A semiconductor laser pumped solid state laser according to claim 1, further comprising a resonator, said resonator comprising at least one $\lambda/4$ plate, and a resonator mirror.

8. A semiconductor laser pumped solid state laser according to claim 7, wherein a first of said at least one $\lambda/4$ plate, and said resonator mirror have reflective surfaces.

* * * * *